United States Patent Office 3,191,314
Patented June 29, 1965

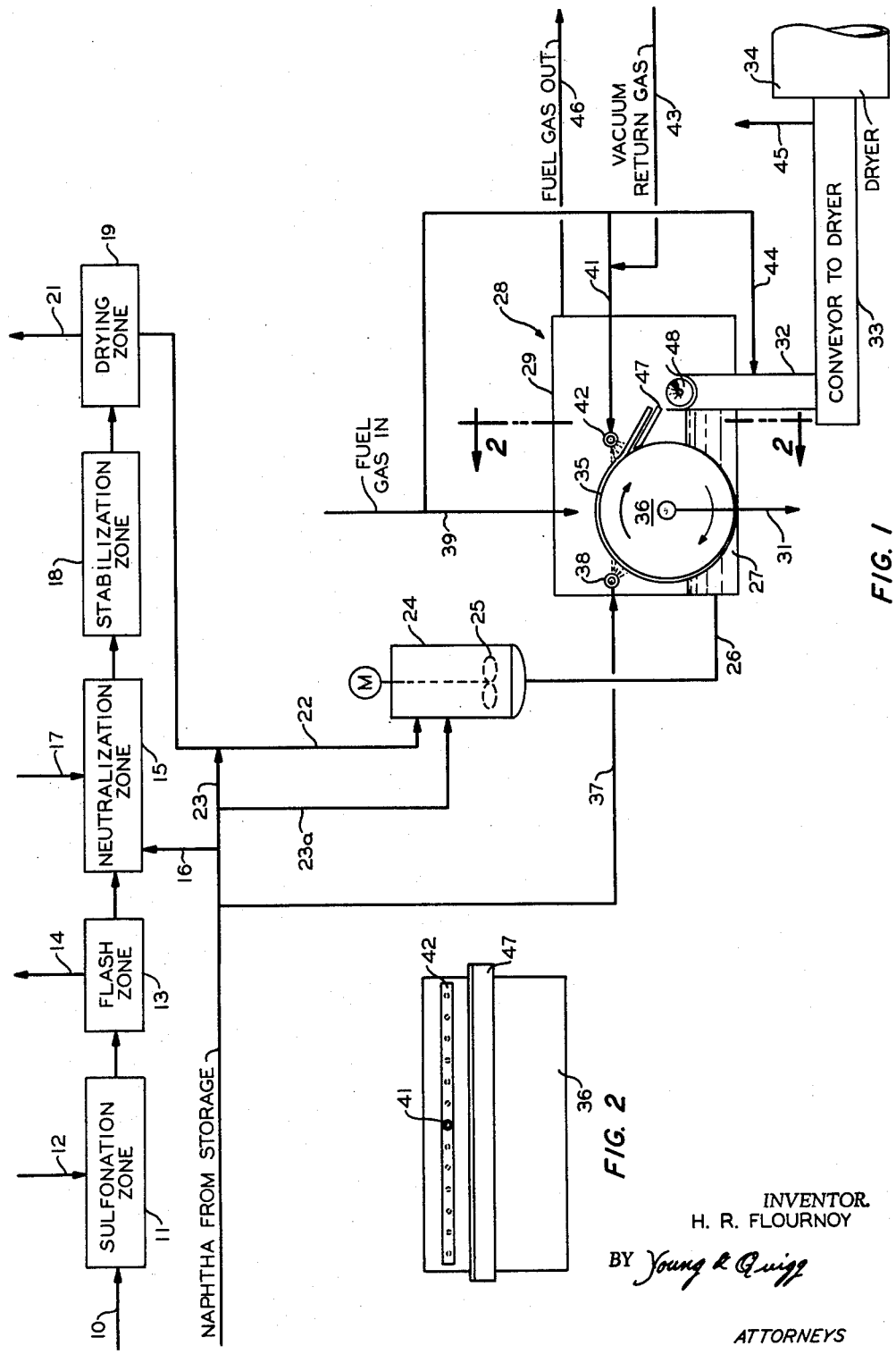

3,191,314
GAS CIRCULATION IN A PRE-COAT FILTER
Houston R. Flournoy, Kansas City, Kans., assignor to Phillips Petroleum Company, a corporation of Delaware
Filed Apr. 23, 1962, Ser. No. 189,333
2 Claims. (Cl. 34—70)

This invention relates to a filtration process. In one aspect it relates to the recovery of calcium petroleum sulfonates from a sulfonation reaction product containing such sulfonates. In still another aspect it relates to a method for overcoming difficulties in the filtration of calcium petroleum sulfonate containing mixtures which arise as a result of the physical properties of the reaction product containing such calcium petroleum sulfonates. In still another aspect it relates to a method and means for preventing recontaminating the filter cake, which is removed from the filter, with water or solvent.

Metal petroleum sulfonates are widely used in the manufacture of lubricating oil additives and greases. Recently a process has been developed for the manufacture of superior metal petroleum sulfonates, particularly calcium petroleum sulfonates, by the sulfonation of a highly viscous, highly refined paraffinic oil fraction having a viscosity of at least about 200 to 230 SUS at 210° F. and having a viscosity index of about 85 to 100 or higher. In the production of these high molecular weight calcium petroleum sulfonates the oil is sulfonated with a sulfonation agent such as fuming sulfuric acid, chlorosulfonic acid, mixtures of chlorosulfonic acid and sulfur trioxide, sulfur trioxide dissolved in liquid sulfur dioxide, and other similar sulfonating agents. No separate sludge phase is produced when these high molecular weight, high viscosity oils are sulfonated and therefore the total reaction product, except for any excess sulfonating agent which can be recovered, is neutralized with an aqueous slurry of a metal hydroxide such as calcium hydroxide (lime) so as to convert simultaneously the sulfonic acids to the corresponding metal petroleum sulfonate and to neutralize all of the inorganic acids in the reaction product. An excess of metal hydroxide is used and it is necessary to remove metal hydroxides and other solid materials such as inorganic salts which remain in the reaction product following the neutralization step. These solids ordinarily are removed in a filtration step and the separation of the lime-neutralized sulfonation mixture, by filtration, is the primary concern of this invention.

By way of further explanation, the problem is to remove calcium sulfate and hydrated lime from a slurry of these solid materials in an oily product. This is a very difficult filtration problem. A rotary drum continuous vacuum filter ordinarily is employed and a doctor knife is used to remove a very thin cake of solid which builds up on the filter surface of the filter drum. A solvent such as naphtha, Stoddard solvent or methyl isobutyl ketone is usually sprayed onto the surface of the filter drum to wash the filter cake prior to its removal by the doctor knife. Usually, as is the case in this invention, a thick precoat of filter aid is provided on the surface of the filter drum and a continuously adjustable doctor knife or scraper is employed which removes a very thin layer of the precoat and thus continuously provides a fresh filter surface.

Filtration of the slime which constitutes the neutralized reaction product of the sulfonation reaction has presented a major problem in the production of the high molecular weight metal petroleum sulfonates. Various proposals have been made for improving the filtration step. It has been found, however, that there are times when the filter cake becomes wet, slimy, and sticky so that the dryer and the conveyor to the dryer becomes clogged with filter cake and it becomes necessary to shut down the operation and clean the conveyor even though the filter appears to be operating satisfactorily.

The problem is to remove inorganic solids (calcium sulfate and hydrated lime when calcium petroleum sulfonate is produced) from a slurry of these solid materials in a solution of sulfonate in a liquid hydrocarbon such as naphtha. A rotary drum continuous vacuum filter ordinarily is employed with a thick precoat of filter aid on its surface and a doctor knife or scraper removes a very thin layer of the precoat along with the solids which build up on the filter surface.

I have found that the filtering operation can be improved and clogging of the conveyor can be substantially eliminated by introducing a normally gaseous hydrocarbon, such as fuel gas, into and through the filter case and into and through the enclosed conveyor which conveys filter cake to the dryer. The practice in the past has been to introduce fuel gas into the vapor-tight case enclosing the drum filter to maintain a positive pressure on the filter. Any excess of fuel gas, which was not drawn through the filter medium by the vacuum within the drum, passed out through the filter cake conveyor. It is necessary to introduce a gas into the filter case in order to maintain a pressure differential across the filter medium; however, it is believed that the mere introduction of gas into the filter case aggravates the formation of "mud" or wet filter cake in the filter cake conveyor because the gas carries hydrocarbon vapors (from the liquid hydrocarbon wash applied to the filter cake on the filter drum) into the conveyor where the vapors condense and wet the filter cake.

In accordance with the present invention, I prevent condensation of vapors in the conveyor by introducing a flow of a substantially noncondensible gas into the enclosed conveyor so that a first portion of the gas is removed at the conveyor outlet and a second portion of the gas passes into the filter case. Further in accordance with the invention, I pass a substantially noncondensible gas into the filter drum case into contact with the filter cake being removed from the filter. The amount of gas introduced into the filter case and conveyor is not critical and is the same amount used in the prior art. The pressure differential across the filter medium is maintained constant as in the prior art. The excess gas, over that required to maintain the desired pressure differential across the filter medium, is vented from the filter case. According to the practice of the invention, the noncondensible gas shields the filter cake, which is removed from the filter, from the hydrocarbon vapors of the liquid hydrocarbon wash applied to the solids on the filter drum. The gas introduced into the filter case lowers the partial pressure of the hydrocarbon vapor in contact with the liquid hydrocarbon in the filter cake and also absorbs hydrocarbon from the filter cake to reduce still further the tendency for the filter cake to become wet in the conveyor.

It is an object of the invention to provide a method for reducing conveyor and dryer plugging with wet filter cake in a filtration process. It is also an object to provide apparatus for reducing conveyor and dryer plugging with wet filter cake in a filtration process. Another object is to provide a method and means for preventing recontamination of a filter cake with liquid hydrocarbon in a process for filtering petroleum sulfonate slimes. Still another object is to provide a blanket of a substantially noncondensible gas to shield a filter cake from condensible vapors in its travel from a filtering operation to a drying operation. Other objects, features and advantages will be apparent to one skilled in the art upon studying the disclosure of the invention including the detailed description of the invention and the appended drawing wherein:

FIGURE 1 is a schematic flow diagram of a process for the production of a metal petroleum sulfonate wherein the invention is practiced; and FIGURE 2 is a view of the filter drum of FIGURE 1 along lines 2—2.

The invention will now be described as applied to a process for producing calcium petroleum sulfonate from a solvent extracted, propane fractionated and dewaxed Mid-Continent bright stock having a viscosity of about 200 to 210 SUS at 210° F. and having a viscosity index of about 90 to 98.

In FIGURE 1 an oil, as above described, is diluted with $SO_2$ (sulfur dioxide) and passed via conduit 10 to sulfonation zone 11 where it is intimately contacted with a stream of $SO_3$ (sulfur trioxide) dissolved in $SO_2$ introduced via conduit 12. The $SO_2$ and any remaining $SO_3$ is flashed in flash zone 13, the $SO_2$—$SO_3$ being returned to the process via conduit 14. The reaction product is passed to neutralization zone 15, diluted with naphtha introduced via conduit 16 and intimately contacted with an aqueous slurry of calcium hydroxide (lime) introduced via conduit 17. The total slurry is then passed to stabilization zone 18 wherein the reaction product is maintained in the presence of the lime at elevated temperature and elevated pressure so as to stabilize the calcium petroleum sulfonate with respect to ferrous corrosion. The stabilized mixture is then passed to drying zone 19 wherein water is removed from the mixture via conduit 21. The mixture is then passed via conduit 22, along with a further amount of naphtha introduced via conduit 23 to the filter feed tank 24 wherein the mixture is agitated by an agitator 25 to prevent settling of the solid material contained therein. Additional dilution naphtha can be introduced via conduit 23a as required. The mixture of calcium sulfonate, calcium sulfate, hydrated lime and naphtha is passed via conduit 26 to the pan 27 of the filter 28. The filter 28 is enclosed in a vapor-tight case 29. Filtrate is removed via conduit 31 and filter cake is removed via enclosed chute 32 and enclosed conveyor 33 to a dryer 34. The filter cake 35 on filter drum 36 is washed with a spray of naphtha introduced via conduit 37 and spray header 38. Fuel gas is admitted to the interior of filter case 29 via conduit 39, conduit 41 and spray header 42. Vacuum pump return gas, which is substantially fuel gas, is added to conduit 41 via conduit 43. Fuel gas is also introduced into chute 32 via conduit 44 so that a first portion of fuel gas travels upwardly through chute 32 and into filter case 29 and a second portion of fuel gas travels downwardly through chute 32 through conveyor 33 and is vented via conduit 45. Excess fuel gas in casing 29, over that required to maintain the desired pressure differential across the filter medium on filter drum 36, is vented from filter casing 29 via conduit 46. The gas vented via conduits 45 and 46 is utilized as fuel or can be recovered for further use.

The dryer 34 can be any conventional dryer such as a rotary kiln; the drum filter can be any conventional rotating drum vacuum filter adapted for use with a precoat of filter aid; and the conveyor 33 can be any enclosed conveyor such as an endless belt or an auger type conveyor.

The filter cake 35, removed from filter drum 36 by doctor knife 47, is advantageously directed into chute 32 by augers indicated at 48.

Various pumps, meters, valves and other conventional items of equipment have been omitted from the drawing so as to simplify presentation of the invention; however, those skilled in the art will recognize the need for such and will find no difficulty in supplying same. For example, it will be recognized that valves, orifices or other flow control means will be required in conduits such as 39, 41 and 44 to proportion the flow through these conduits.

That which is claimed is:

1. In the process of filtering petroleum sulfonate slimes produced by sulfonating a viscous, highly refined bright stock and neutralizing the resulting sulfonic acid with a basic alkaline earth metal compound wherein the sulfonate slime is filtered on a precoated, rotary vacuum filter contained in a vapor-tight case and the filter cake is passed by means of an enclosed chute and an enclosed conveyor to a drying zone, a substantially constant positive pressure being maintained in the vapor-tight case by a noncondensible gas introduced into said case, the improvement comprising passing a stream of noncondensible hydrocarbon gas into said enclosed chute; dividing said stream so that a first portion of said gas introduced into said chute passes into said filter case and a second portion of said gas passes from said chute into the conveyor leading to the dryer; venting from the conveyer outlet the gas passing to the conveyor; and venting gas from the filter case in excess of that required to maintain a substantially constant positive pressure in the filter case.

2. In a system for removing solids from a solution of a petroleum sulfonate in a liquid hydrocarbon comprising a rotary vacuum filter enclosed in a vapor-tight case, means to introduce a noncondensible gas to said case so as to maintain a substantially constant positive pressure on the filter in the filter case, means to vent excess gas from said case, a filter cake dryer, an enclosed conveyor having an outlet connected to said dryer and an inlet connected to said filter case by means of an enclosed chute, the combination therewith of means to pass a noncondensible gas into said enclosed chute; and means to remove from the outlet of said enclosed conveyor a first portion of the gas introduced to the chute so that the gas stream is divided and a second portion of the gas introduced into the chute passes into the filter case so as to maintain a substantially constant positive pressure on the filter in the filter case.

References Cited by the Examiner
UNITED STATES PATENTS

| 1,512,321 | 10/24 | Wait | 34—37 |
|---|---|---|---|
| 2,049,071 | 7/36 | McCormick | 210—152 X |
| 2,957,861 | 10/60 | Goins | 210—68 X |
| 3,023,231 | 2/62 | Logan. | |

RUEBEN FRIEDMAN, *Primary Examiner.*

HERBERT L. MARTIN, HARRY B. THORNTON,
*Examiners.*